United States Patent [19]

Nedzu et al.

[11] Patent Number: 5,108,806
[45] Date of Patent: Apr. 28, 1992

[54] HEAT-SEALABLE POLYBUTYLENE TEREPHTHALATE FILM

[75] Inventors: Shigeru Nedzu; Masaharu Watanabe, both of Shizuoka, Japan

[73] Assignee: Polyplastics Co., Ltd., Osaka, Japan

[21] Appl. No.: 548,541

[22] Filed: Jul. 5, 1990

[30] Foreign Application Priority Data

Jul. 7, 1989 [JP] Japan .................................. 1-176739

[51] Int. Cl.⁵ .............................................. C08L 67/02
[52] U.S. Cl. ................................. 428/35.2; 428/35.5; 525/439; 264/563; 264/176.1
[58] Field of Search ............... 525/439; 428/35.2, 35.5; 264/176.1, 563

[56] References Cited

U.S. PATENT DOCUMENTS

| | | | |
|---|---|---|---|
| 3,956,229 | 5/1976 | Bollen et al. | 525/439 |
| 4,515,863 | 5/1985 | Caines | 528/287 |
| 4,515,925 | 5/1985 | Kleiner et al. | 525/439 |
| 4,906,709 | 3/1990 | Morris et al. | 525/439 |

FOREIGN PATENT DOCUMENTS 0078020  5/1983  European Pat. Off. .

Primary Examiner—James J. Seidleck
Attorney, Agent, or Firm—Nixon & Vanderhye

[57] ABSTRACT

Heat-sealable films formed of a polybutylene terephthalate resin composition including between 50 to 95% by weight of a polybutylene terephthalate base resin having an intrinsic viscosity of 0.7 or greater, and between 5 to 50% by weight of a polycarbonate resin having an intrinsic viscosity of 0.4 or greater melt-blended with the polybutylene terephthalate base resin.

9 Claims, 1 Drawing Sheet

HEAT-SEALABLE POLYBUTYLENE TEREPHTHALATE FILM

FIELD OF THE INVENTION

The present invention relates to polybutylene terephthalate (PBT) films. More specifically, the PBT films of the present invention exhibit excellent heat sealing characteristics over a wide heat-sealing temperature range without detrimentally affecting the other desirable properties inherent in polybutylene terephthalate resin, particularly heat resistance, chemical resistance, and mechanical strength properties.

BACKGROUND AND SUMMARY OF THE INVENTION

A number of flexible packing materials are currently used for packing foodstuffs, pharmaceuticals, medical appliances, and the like. Representative examples of conventional packing materials include single ply films prepared by subjecting a polyolefin resin, such as polyethylene, polypropylene, ethylene-α-olefin copolymer, ethylene-vinyl acetate copolymer or ethylene-acrylic acid copolymer, to inflation molding, T-die cast molding or the like. Single ply films of polyethylene terephthalate resin polybutylene terephthalate, polyamide resins, and polyacrylonitrile resin, have also been used in the past. In addition, composite films prepared by laminating the above-described films on an appropriate base film or combining the above-described resins to form a film have also been used previously as packaging materials.

Polyolefin resin films have generally been used where heat-sealing capabilities are desired due to the good heat-sealing properties that polylefin films exhibit. However, as compared to films of polyester resins, such as polyethylene terephthalate (PET) and polybutylene terephthalate (PBT), and polyamide resins, polyolefin films have several physical disadvantages such as lower heat-resistance temperatures, and inferior chemical resistance and gas barrier properties. For these reasons, films of polyester resins have been studied as an alternative to polyolefin films as a heat-sealing layer of packing materials for foodstuffs and pharmaceuticals.

However, in order to improve the heat resistance properties of films formed of PET resins, the films should be subjected to biaxial orientation. Unfortunately, when PET resin films are biaxially oriented, they cannot be heat-sealed. On the other hand, conventional PBT resin films exhibit excellent characteristics when used as a packing material in the absence of biaxial orientation because of their excellent heat resistance, chemical resistance, and gas barrier resistance properties. However, the heat-sealing properties of conventional PBT films is still unsatisfactory. It is therefore towards providing films of PBT resin with improved heat-sealing properties that the present invention is directed.

Broadly, the present invention is directed towards heat-sealable films of polybutylene terephthalate resin that may be usable as a packing material. More specifically, the present invention is embodied in a film formed of a PBT resin composition that includes a PBT base resin, and a heat-sealing effective amount of a polycarbonate resin.

Preferably, the present invention is embodied in a film or a sheet having excellent heat-sealing properties and which comprises a polybutylene terephthalate resin composition composed of a blend of between 50 to 95% by weight of a polybutylene terephthalate resin having an intrinsic viscosity of 0.7 or greater as determined at 25° C. in o-chlorophenol, and between 5 to 50% by weight of a polycarbonate resin having an intrinsic viscosity of 0.4 or greater as determined at 20° C. in methylene chloride.

Further aspects of this invention will become more clear after consideration is given to the following detailed description of the preferred exemplary embodiments thereof.

BRIEF DESCRIPTION OF THE ACCOMPANYING DRAWINGS

FIG. 1 is a schematic perspective view of a heat-sealing device employed in the heat-sealing tests described below in the Examples.

DETAILED DESCRIPTION OF THE PREFERRED EXEMPLARY EMBODIMENTS

Figure 1:
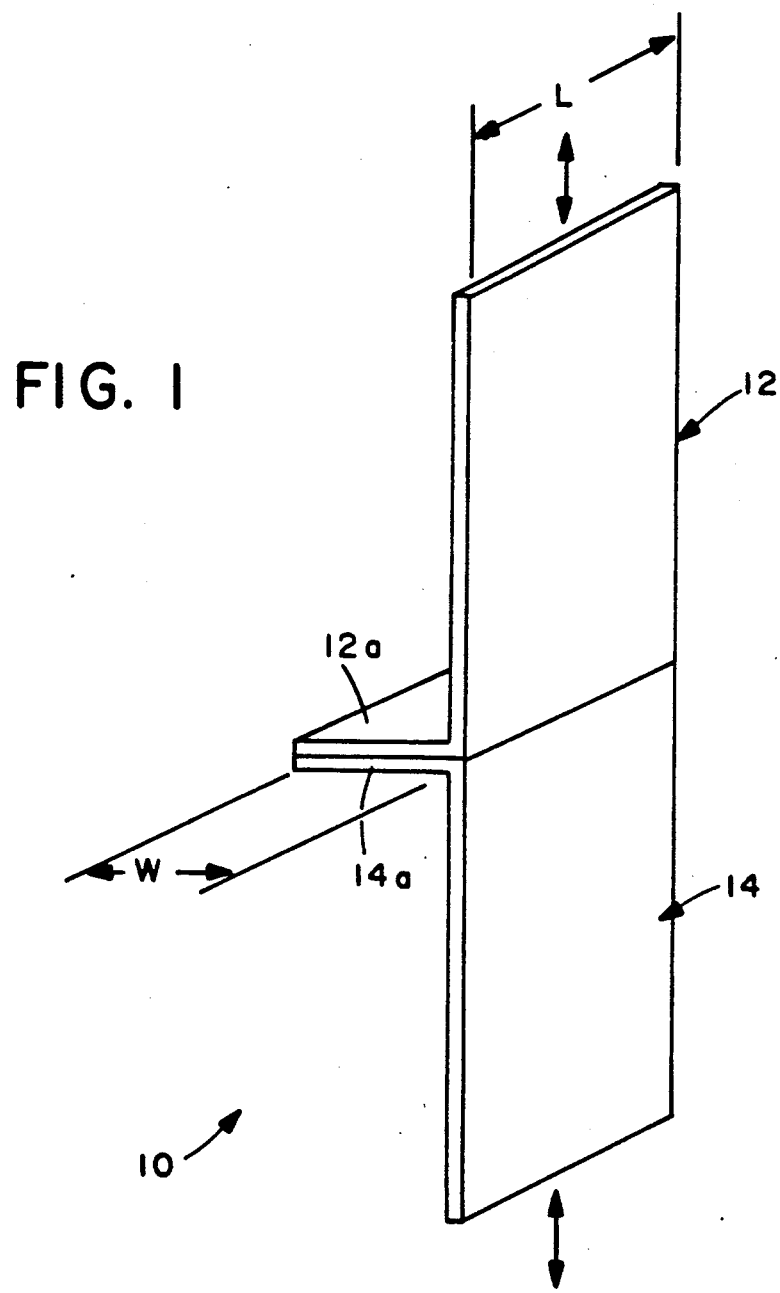

The term "polybutylene terephthalate (PBT) base resin" as used herein and in the accompanying claims are intended to refer to polyesters mainly composed of repeating butylene terephthalate units. More specifically, the preferred polybutylene terephthalate (PBT) base resin is a polyester prepared by condensing 1,4-butanediol with terephthalic acid or an ester thereof with a lower alcohol, and may be a copolymer mainly composed of polybutylene terephthalate.

The intrinsic viscosity (25° C. in o-chlorophenol) of the PBT base resin is at least 0.7 or greater. PBT resin having an intrinsic viscosity of below 0.7 exhibits poor heat-sealing properties because the bonding strength during heat sealing and the tensile elongation of the film are both low. There is, however, no particular limitation on the upper limit of the intrinsic viscosity of the polybutylene terephthalate resin. However, excessively high intrinsic viscosity will make it more difficult to prepare the PBT resin. Therefore, the upper limit of the intrinsic viscosity is practically limited by the ease of preparing the PBT resin.

The polycarbonate resin which is homogeneously blended with the polybutylene terephthalate base resin according to the present invention can be prepared by the solvent process, i.e., by the reaction of a dihydric phenol with a carbonate precursor, such phosgene, or transesterification of a dihydric phenol iwth a carbonate precursor, such as diphenyl carbonate, in a solvent, such as methylene chloride, in the presence of a known acid acceptor and a molecular weight modifier.

Suitable examples of the dihydric penol include bisphenols, among which 2,2-bis(4-hydroxyphenyl)-propane, i.e., bisphenol A is particularly preferred. The bisphenol A may be partly or wholly substituted with other dihydric phenol. Examples of the dihydric phenol other than bisphenol A include compounds such as hydroquinone, 4,4-dihydroxydiphenyl, bis(4-hydroxyphenyl)alkane, bis(4-hydroxyphenyl)cycloalkane, bis(4-hydroxyphenyl)sulfide, bis(4-hydroxyphenyl)sulfone, bis(4-hydroxyphenyl)sulfoxide, and bis(4-hydroxyphenyl)ether; and halogenated bisphenols, such as bis(3,5-dibromo-4-hydroxyphenyl)propane and bis(3,5-dichloro-4-hydroxyphenyl)propane. These dihydric phenols may be a homopolymer of a dihydric phenol, or a copolymer of two or more of the same. Furthermore, the polycarbonate resin used in the present invention may be a thermoplastic, randomly branched polycarbonate prepared by reacting a polyfunctional aromatic compound with a dihydric phenol and/or a carbonate precursor.

The polycarbonate resin employed in the present invention should exhibit an intrinsic viscosity (20° C. in methyl chloride) of at least 0.4 or greater.

When the intrinsic viscosity of the polycarbonate resin is less than 0.4, the tensile strength and, particularly, the tensile elongation of the film are deleteriously affected. There is no particular limitation on the upper limit of the intrinsic viscosity of the polycarbonate resin. However, excessively high intrinsic viscosity will, similar to the PBT resin, make it more difficult to prepare the polycarbonate resin. Furthermore, excessively high intrinsic viscosity will translate into poor dispersibility of the polycarbonate resin in the polybutylene terephthalate base resin, resulting in poor bonding strength during heat sealing. Therefore, the upper limit of intrinsic viscosity is limited by the above-noted practical considerations.

It is most preferred that the polybutylene terephthalate base resin and the polycarbonate resin have intrinsic viscosities that are respectively greater than 0.7 and 0.4, in addition to having a viscosity ratio $\eta_A/\eta_B$ that is between 0.10 to 1.5, the following:

wherein $\eta_A$ is the melt viscosity of the polybutylene terephthalate base resin as determined at 260° C. and a shear rate of 100 $sec^{-1}$, and $\eta_B$ is the melt viscosity of the polycarbonate resin as determined at 260° C. and a shear rate of 100 $sec^{-1}$.

When the viscosity ratio $\eta_A/\eta_B$ is less than 0.10, the dispersion of the polycarbonate resin in the polybutylene terephthalate resin during melt blending is poor. As a result, the formed film exhibits poor heat-sealing characteristics and low mechanical strength properties, particularly tensile strength and tensile elongation properties. The same adverse effects as described above are observed when the viscosity ratio exceeds 1.5. The viscosity ratio is most preferably between 0.3 to 0.8.

The films of the present invention may be molded by any conventional film-forming technique, such as, inflation molding, or T-die molding techniques.

The films thus obtained according to the present invention exhibit excellent heat-sealing characteristics. That is the films of this invention exhibit heat-sealing strengths of at least 0.5 kg/15 mm, as determined using a film specimen having a width of 15 mm. In order to reliably achieve these improved sealing strengths, it is necessary that the films exhibit a relatively large heat-sealing temperature range. More specifically, the films of the present invention are heat-sealable over an absolute temperature range of 10° C. or greater.

Known additives for thermoplastic and thermosetting resins may be included in the films of this invention. Examples of such additives include plasticizers, stabilizers such as antioxidants and ultraviolet absorbers, lubricants, antistatic agents, surfactants, and colorants such as dyes and pigments. These additives are incorporated in the compositions forming the films of the present invention as may be desired for intended performance characteristics, provided they do not significantly adversely affect the film's heat-sealing property. Other thermoplastic resins and inorganic fillers may also be added as auxiliary components in amounts that will not adversely affect the heat-sealability of the resulting film.

The films of the present invention exhibit excellent heat-sealability properties in addition to excellent heat resistance, chemical resistance, oil resistance, mechanical strength, and gas barrier properties typically associated with PBT resins generally. Thus, the films of the present invention are suitable for use as packing materials, especially an internal layer for composite films used as packaging materials. Thus, containers formed by heat-sealing the films of this invention likewise exhibit the above-described properties and are also suitable as packaging containers.

The films of the present invention may be used as a single layer or may be laminated onto other packaging films. As a result, the films of this invention can be used generally as a food packaging, in addition to a more specific use as a lid material having excellent heat-sealability to container bodies formed of thermoplastic resins.

EXAMPLES

The present invention will now be described in more detail by way of the following non-limiting Examples.

The data and observations reported below were obtained under the following conditions

Heat-sealability

Heat-sealing was conducted by means of a heat-sealing device 10 as shown on accompanying FIG. 1. The heat-sealing device 10 included an opposing pair of generally L-shaped heat-sealing members 12, 14 which established heat-sealing sections 12a, 14a, respectively, having a width W of 10 mm. The members 12, 14 were movable relative to one another so that film specimens could be placed therebetween and heat-sealed using a selected pressure and for a selected time period. In this regard, the length L of the device 10 was 15 mm and corresponded to the film specimen width that was evaluated. The heat-sealed film specimens were cooled to room temperature and the bonding strength was measured to determine the absolute temperature range necessary to attain a bonding strength of 0.5 kg/15 mm or more. The heat-sealing temperature range was evaluated according to the following four qualitative ranks:

⊚: very excellent (an absolute temperature range of 20° C. or more)

○: excellent (an absolute temperature range of 10° to 20° C.)

Δ: slightly poor (an absolute temperature range of 5° to 10° C.)

×: poor (an absolute temperature range of 5° C. or below)

Film Molding Methods

Inflation: Molding was conducted by an upward drawing, room temperature cooling system using a 50-mmφ extruder provided with a 200-mmφ annular die.

T-die: Molding was conducted by a water cooling system through using a 65-mmφ extruder provided with an 800-mmφ annular die.

Heat Resistance A

A film test piece measuring 150 mm×20 mm and a gage-to-gage distance of 100 mm was heated by means of a blow-drier at 190° C. for 30 minutes and allowed to stand under room conditions of 23° C. and 50% RH for 3 hr. The gage-to-gage distance was then measured to determine the shrinkage in the film-forming machine direction (MD) the resin film, and in the transverse machine direction (TD). When both the MD and TD shrinkages were 3% or less, the heat resistance was evaluated as ◯. When both the MD and TD shrinkages were 3 to 7%, the heat resistance was evaluated as Δ. And, finally, when both the MD and TD shrinkages were 7% or more, the heat resistance was evaluated as Δ.

Heat Resistance B

A film test piece was heated by means of a blow-drier at 190° C. for 30 minutes and allowed to stand in room conditions of 23° C. and 50% RH for 3 hr. The tensile strength and tensile elongation were then measured according to JIS Z 1707.

When the tensile strength and the tensile elongation retention values were 90% or more and 50% or more, respectively, the heat resistance was evaluated as ◯. When the tensile strength and tensile elongation retention values were 70 to 90% and 30 to 50 respectively, the heat resistance was evaluated as Δ. And, finally, when the tensile strength and tensile elongation retention values were 70% or less and 30% or less, respectively, the heat resistance was evaluated as ×.

Chemical Resistance

A sample heat-sealed in the same manner as that employed in the heat-sealability measurements was immersed in d-limonene at 23° C. for one week. The bonding strength of the heat-seal was then measured and evaluated according to the following criteria:
- ⊚: very excellent (bonding strength reduction of 5% or less)
- ◯: excellent (bonding strength reduction of 5 to 10%)
- Δ: slightly poor (bonding strength reduction of 10 to 30%)
- ×: poor (bonding strength reduction of 30% or more)

Oil Resistance

A film sample heat-sealed in the same manner as that employed in the heat-sealability measurements was immersed in an edible oil at 23° C. for one week. Thereafter, the bonding strength was measured and evaluated according to the following criteria:
- ⊚: very excellent (bonding strength reduction of 5% or less)
- ◯: excellent (bonding strength reduction of 5 to 10%)
- Δ: slightly poor (bonding strength reduction of 10 to 30%)
- ×: poor (bonding strength reduction of 30% or more)

EXAMPLES 1 TO 6

A polybutylene terephthalate (PBT) resin having an intrinsic viscosity of 1.4 was melt-blended with a polycarbonate (PC) resin having an intrinsic viscosity of 0.51 ($\eta_A/\eta_B$ (viscosity ratio)=0.54) in PBT to PC ratios of 95:5, 90:10, 85:15, 80:20, 70:30 and 50:50 by means of a 40-mmφ biaxial extruder, and resin pellets were prepared therefrom. The pellets were then molded into 25 μm-thick tubular films by means of an inflation film molding machine and subjected to various tests, i.e., tests on the heat sealability, heat resistance, chemical resistance and oil resistance. The results are shown in Table 1.

EXAMPLES 7 AND 8

A PBT resin having an intrinsic viscosity of q.4 was melt-blended with a PC resin having an intrinsic viscosity of 0.6 ($\eta_A/\eta_B$ (viscosity ratio) =0.33) in PBT to PC ratios of 85:15 and 80:20 by means of a biaxial extruder, and resin pellets were prepared therefrom. The pellets were then molded into 25 μm-thick tubular films by means of an inflation film molding machine and subjected to the same tests as those of Examples 1 to 6. The results are shown in Table 1.

EXAMPLES 9 TO 13

Polybutylene terephthalate resins respectively having intrinsic viscosities of 1.2, 1.0 and 0.75 were melt-blended with polycarbonate resins respectively having intrinsic viscosities of 0.6, 0.51 and 0.4 by means of a 40-mmφ biaxial extruder in the mixing ratios specified in Table 1, and resin pellets were prepared therefrom. The pellets were then molded into 25 μm-thick tubular films by means of an inflation film molding machine or a T-die folm molding machine, and subjected to the same tests as those of Examples 1 to 6. The results are shown in Table 1.

COMPARATIVE EXAMPLES 1 TO 5

Polybutylene terephthalate resins respectively having intrinsic viscosities of 1.4, 1.2, 1.0 and 0.75 were melt-blended with polycarbonate resins respectively having intrinsic viscosities of 0.51 and 0.39 in the blending ratios specified in Table 1 by means of a 40-mmφ biaxial extruder, and resin pellets were prepared therefrom. The pellets were then molded into 25 μm-thick tubular films by means of an inflation film molding machine or a T-die film molding machine, and subjected to the same tests as those of Examples 1 to 6. The results are shown in Table 1.

TABLE 1

| | PBT resin | | PC resin | | | | | Heat resistance | | | |
|---|---|---|---|---|---|---|---|---|---|---|---|
| | intrinsic viscosity (IV) | mixing ratio (wt. %) | intrinsic viscosity (IV) | mixing ratio (wt. %) | $\eta_A/\eta_B$ | Heat sealability | Film molding method | A | B | Chemical resistance | Oil resistance |
| Ex. 1 | 1.4 | 95 | 0.51 | 5 | 0.54 | ◯ | inflation | ◯ | ◯ | ◯ | ◯ |
| Ex. 2 | 1.4 | 90 | 0.51 | 10 | " | ◯ | " | ◯ | ◯ | ◯ | ⊚ |
| Ex. 3 | 1.4 | 85 | 0.51 | 15 | " | ⊚ | " | ◯ | ◯ | ⊚ | ⊚ |
| Ex. 4 | 1.4 | 80 | 0.51 | 20 | " | ⊚ | " | ◯ | ◯ | ⊚ | ⊚ |
| Ex. 5 | 1.4 | 70 | 0.51 | 30 | " | ⊚ | " | ◯ | ◯ | ⊚ | ⊚ |
| Ex. 6 | 1.4 | 50 | 0.51 | 50 | " | ⊚ | " | ◯ | ◯ | ◯ | ⊚ |
| Ex. 7 | 1.4 | 85 | 0.6 | 15 | 0.33 | ⊚ | " | ◯ | ◯ | ⊚ | ⊚ |
| Ex. 8 | 1.4 | 80 | 0.6 | 20 | " | ◯ | " | ◯ | ◯ | ⊚ | ⊚ |
| Ex. 9 | 1.2 | 80 | 0.6 | 20 | 1.15 | ◯ | " | ◯ | ◯ | ⊚ | ⊚ |
| Ex. 10 | 1.2 | 80 | 0.51 | 20 | 0.38 | ⊚ | " | ◯ | ◯ | ◯ | ◯ |
| Ex. 11 | 1.0 | 80 | 0.51 | 20 | 0.15 | ◯ | T-die | ◯ | ◯ | ◯ | ◯ |
| Ex. 12 | 1.0 | 80 | 0.4 | 20 | 0.31 | ⊚ | " | ◯ | ◯ | ◯ | ◯ |
| Ex. 13 | 0.75 | 80 | 0.4 | 20 | 0.13 | ◯ | " | ◯ | ◯ | ◯ | ◯ |
| Comp. Ex. 1 | 1.4 | 100 | — | — | — | Δ | inflation | ◯ | ◯ | ◯ | ◯ |

TABLE 1-continued

|  | PBT resin intrinsic viscosity (IV) | PBT resin mixing ratio (wt. %) | PC resin intrinsic viscosity (IV') | PC resin mixing ratio (wt. %) | $\eta_A/\eta_B$ | Heat sealability | Film molding method | Heat resistance A | Heat resistance B | Chemical resistance | Oil resistance |
|---|---|---|---|---|---|---|---|---|---|---|---|
| Comp. Ex. 2 | 1.4 | 45 | 0.51 | 55 | 0.54 | Δ | " | Δ | Δ | Δ | ◯ |
| Comp. Ex. 3 | 1.2 | 80 | 0.39 | 20 | 0.55 | Δ | " | ◯ | X | ◯ | ◯ |
| Comp. Ex. 4 | 1.0 | 80 | 0.39 | 20 | 0.33 | Δ | T-die | ◯ | X | ◯ | ◯ |
| Comp. Ex. 5 | 0.75 | 80 | 0.51 | 20 | 0.06 | Δ | " | Δ | Δ | Δ | ◯ |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A heat-sealable film comprised of a polybutylene terephthalate resin composition that includes a melt-blend of (i) between 50 and 95% by weight of a polybutylene terephthalate base resin having an intrinsic viscosity of 0.7 or greater as measured at 25° C. in o-chlorophenol, and (ii) between 5 to 50% by weight of a polycarbonate resin having an intrinsic viscosity of 0.4 or greater as measured at 20° C. in methylene chloride, and wherein said polybutylene terephthalate resin composition has a viscosity ratio $\eta_A/\eta_B$ of between 0.10 to 1.15, wherein $\eta_A$ and $\eta_B$ are the respective melt viscosities of the polybutylene terephthalate base resin and polycarbonate resin as determined at 260° C. and a shear rate of 100 sec$^{-1}$.

2. A heat-sealable film as in claim 1, wherein the film exhibits a heat-seal bonding strength of at least 0.5 kg/15 mm.

3. A heat-sealable film as in claim 2, wherein said film is heat-sealable within a temperature range having at least a 10° C. or greater temperature difference between low and high temperatures in said range.

4. A packaging container comprised of heat-sealed film according to claims 1, 2 or 3.

5. A packaging container as in claim 4, wherein said heat-sealed film in a single ply film layer.

6. A packaging container as in claim 4, wherein said heat-sealed film is an inner layer of a multi-layered composite film.

7. A method of imparting heat-sealing properties to polybutylene terephthalate films comprising forming a polybutylene terephthalate composition by melt-blending a heat-sealing effective amount of (i) between 5 to 50% by weight of a polycarbonate resin having an intrinsic viscosity of 0.4 or greater as measured at 20° C. in methylene chloride with (ii) between 50 to 95% by weight of a polybutylene terephthalate base resin having an intrinsic viscosity of 0.7 or greater as measured at 25° C. in o-chlorophenol, said polybutylene terephthalate composition having a viscosity ratio $\eta_A/\eta_B$ of between 0.10 to 1.5, wherein $\eta_A$ and $\eta_B$ are the respective melt viscosities of the polybutylene terephthalate base resin and polycarbonate resin as determined at 260° C. and a shear rate of 100 sec$^{-1}$, and then forming a film of said polybutylene terephthalate composition.

8. A method as in claim 2, wherein said film is formed by inflation molding.

9. A method as in claim 7, wherein said film is formed by T-die molding.

* * * * *

UNITED STATES PATENT AND TRADEMARK OFFICE
CERTIFICATE OF CORRECTION

PATENT NO. : 5,108,806
DATED : April 28, 1992
INVENTOR(S) : Nedzu et al

It is certified that error appears in the above-identified patent and that said Letters Patent is hereby corrected as shown below:

Column 1, line 26, after "resin" insert a comma (,);
Column 1, line 27, change "resin" to --resins--;

Column 2, line 23, change "are" to --is--.

Column 3, line 25, after "1.5," delete "the following:";
line 45, after "That is" insert a comma (,).

Column 4, line 12, after "as" delete "a";
line 21, after "conditions" insert a colon (:).

Column 6, line 17, after "of" delete "q.4" and insert --1.4--.

Column 8, line 16, after "film" delete "in" and insert --is--.

Signed and Sealed this

Twenty-first Day of June, 1994

Attest:

BRUCE LEHMAN

*Attesting Officer*  *Commissioner of Patents and Trademarks*